(12) United States Patent
Lewandowski

(10) Patent No.: US 9,719,844 B2
(45) Date of Patent: Aug. 1, 2017

(54) ANALYTICAL BALANCE WITH A WEIGHING CHAMBER HAVING STRUCTURE OPERATING AS A LOCKING MECHANISM DUE TO UNIQUE METHOD OF ASSEMBLING AND DISASSEMBILING COMPONENTS OF THE CHAMBER

(71) Applicant: Witold Lewandowski, Radom (PL)

(72) Inventor: Witold Lewandowski, Radom (PL)

(73) Assignee: RADWAG WAGI ELEKTRONICZNE WITOLD LEWANDOWSKI, Radom (PL)

( * ) Notice: Subject to any disclaimer, the term of this patent is extended or adjusted under 35 U.S.C. 154(b) by 104 days.

(21) Appl. No.: 14/403,184

(22) PCT Filed: May 27, 2013

(86) PCT No.: PCT/PL2013/000068
§ 371 (c)(1),
(2) Date: Nov. 23, 2014

(87) PCT Pub. No.: WO2013/176561
PCT Pub. Date: Nov. 28, 2013

(65) Prior Publication Data
US 2015/0107912 A1    Apr. 23, 2015

(30) Foreign Application Priority Data

May 25, 2012 (PL) .......................... 399313

(51) Int. Cl.
*G01G 21/28* (2006.01)

(52) U.S. Cl.
CPC .................. *G01G 21/286* (2013.01)

(58) Field of Classification Search
CPC ...................................... G01G 21/286
See application file for complete search history.

(56) References Cited

U.S. PATENT DOCUMENTS 4,921,058 A * 5/1990 Pally ............... G01G 21/286
                                                          177/126
5,298,688 A    3/1994 Luechinger et al.
(Continued)

FOREIGN PATENT DOCUMENTS

DE    102008008486 A1    6/2009
EP      0496952 A1       8/1992
(Continued)

*Primary Examiner* — Randy Gibson
(74) *Attorney, Agent, or Firm* — Andrew Malarz

(57) ABSTRACT

A weighing chamber in a shape of a transparent cuboid with sliding panels (1, 2, 3, 4, 5) assembled on structural guides (8) that are fastened using at least a single adjustable lock (13) blocking at least one panel in a way that their releasing enables sliding and disassembling the other panels. The fastening lock forms a profiled element, preferably an angle bar shaped component assembled in a detachable manner to the horizontal structural beam (8). The chamber comprises two vertical columns (6, 7) assembled at the back corners of the chamber's interior which support the chamber structure (8) comprising a horizontal beam for assembling the fastening lock and guides for holding and sliding the top and side panels using grips (9, 10, 11).

13 Claims, 4 Drawing Sheets

(56) References Cited

U.S. PATENT DOCUMENTS

| | | | | |
|---|---|---|---|---|
| 5,874,694 | A * | 2/1999 | Ruedisueli | G01G 21/286 |
| | | | | 177/180 |
| 6,504,112 | B1 * | 1/2003 | Luebke | G01G 21/286 |
| | | | | 177/180 |
| 6,566,614 | B1 * | 5/2003 | Fluckiger | G01G 21/286 |
| | | | | 177/180 |
| 7,732,720 | B2 * | 6/2010 | Olesen | G01G 21/286 |
| | | | | 177/180 |
| 8,198,553 | B2 * | 6/2012 | Durst | G01G 21/286 |
| | | | | 174/520 |
| 8,203,086 | B2 * | 6/2012 | Izumo | G01G 21/286 |
| | | | | 177/180 |
| 9,115,534 | B2 * | 8/2015 | Kuhlmann | G01G 21/286 |
| 2002/0040814 | A1 * | 4/2002 | Luchinger | G01G 21/286 |
| | | | | 177/180 |
| 2003/0221874 | A1 * | 12/2003 | Leisinger | G01G 23/30 |
| | | | | 177/180 |
| 2006/0185909 | A1 | 8/2006 | Olesen et al. | |
| 2009/0194340 | A1 * | 8/2009 | Mock | G01G 21/286 |
| | | | | 177/180 |
| 2015/0198476 | A1 * | 7/2015 | Wang | G01G 21/286 |
| | | | | 177/238 |

FOREIGN PATENT DOCUMENTS

| | | |
|---|---|---|
| EP | 0574668 A1 | 12/1993 |
| EP | 1195585 A1 | 10/2002 |
| EP | 2088406 A1 | 8/2009 |
| WO | WO-2009/101010 | 8/2009 |

* cited by examiner

ANALYTICAL BALANCE WITH A WEIGHING CHAMBER HAVING STRUCTURE OPERATING AS A LOCKING MECHANISM DUE TO UNIQUE METHOD OF ASSEMBLING AND DISASSEMBILING COMPONENTS OF THE CHAMBER

BACKGROUND OF THE INVENTION

The subject of the invention is a weighing chamber of an analytical balance, intended to protect a balance's weighing pan against air movement causing uncontrolled impact on the measurement accuracy.

A balance described in patent claim EP2088406 featuring a weighing chamber comprising glass parts, and sliding panels assembled on guide bars. The weighing chamber—a shield against air movement, is a cuboid shaped assembly mounted on top of the balance and fixed to its top section using fasteners positioned at corresponding openings in the balance and chamber. The ring-shaped fasteners feature notches for their meshing and fixing by rotation with application of wedge-shaped planes. The chamber consists of sliding top and side panels.

An anti-draft chamber of a balance, described by patent claim no. WO2009/101010, featuring removable panels located in a frame made of guides. The top section of one of the side panels features fastening pins assembled in the top guides, and on tilting it is removed by pulling upwards.

An invention U.S. Pat. No. 6,504,112 describes a balance featuring panels, where the side and top panels are slidable. Movement of these elements is enabled either manually or using motors. The characteristic feature is the design of the sliding side panels on horizontal cylindrical guides preventing skews when slidable.

Similarly, in the invention no. US2006185909, the side panels are slidable, while the top panel is lifted. This chamber features frame shaped structure components with the front and back elements featuring fragmental guiding grooves for sliding the panels, in particular in case of the back frame. The front and back panel are assembled permanently.

A balance, known from a description EP1195585, featuring a weighing section that borders a permanent, stationary part of a balance, and that is enclosed from at least one side with a wall panel, front panel and a top covering panel. At least one of the mentioned panels is sliding using a guiding assembly for opening and closing the weighing section. The guiding assemblies are in fact complex mechanisms, comprising shafts, toothed bars, gears, guide rolls, pulleys and cords. The characteristic feature of the chamber is that the grip design of at least one of the sliding panels is integrated with the guiding assembly and the grip design of the permanent wall panels is integrated with the stationary part. Each of the guiding assemblies locks and releases a corresponding panel using a lock-forming device that can be either locked or unlocked by the fastening mechanisms using simple application of force on the panel and/or the guiding assembly. A holder for lifting the balance, in other words a handle, is configured as a rail to the guiding element of the guiding assembly of the top covering panel.

In already known solutions of the chambers, guidance of the panels is often carried out in a technologically and structurally advanced manner. As in the invention U.S. Pat. No. 5,298,688, they are special two-wheeled rolls moving in encased rails, and the bottom guidance is ensured by a strip attached to the balance, and which are introduced into the grooves of the panels. Another solution, such as in EP0496952, where the panels are guided using toothed bar assembled on vertical shafts and gears, achieved exceptionally high level of complexity.

The purpose of the invention was a weighing chamber of a balance, featuring a simple design, enabling easy and comfortable means of disassembling its components. Additionally, designers' intention was to have a chamber with structure comprising minimum amount of connecting members of a technologically simple structure.

The weighing chamber, forms a superstructure of the weighing device and separates the weighing sections and protects it against ambient conditions impact, and in particular against air movement and air drafts. The weighing chamber has a shape of a transparent cuboid, comprising in its structure sliding panels and guides. The panels are assembled using at least one adjustable lock, locking at least one panel in a way that their release enables sliding movement and disassembling the other panels. The fastening lock forms a profiled element, preferably an angle bar shaped component assembled in a detachable manner to the horizontal structural beam, and preferably using a threaded connection. The chamber comprises two vertical columns assembled at the back corners of the chamber's interior which support the chamber structure comprising a horizontal beam for assembling the fastening lock and guides for holding and sliding the top and side panels using grips. The grips are preferably made of plastic, and fixed bilaterally on the panels, preferably using glue.

The structure of the chamber features a few elements joined with each other in a sequential manner, i.e. with a fixed assembling order, and their mutual stable connection is achieved by at least one blocking member—a lock with shaped bracket. Disassembling of the chamber is substantially enabled by this lock blocking access to all panels of the chamber. Removing the lock provides access to a determined disassembling order of other chamber components— the top panel, back panel and side panels, also in a simplest possible manner, i.e. by pulling them out of the positioning guides. Thus, the structure of the chamber partially resembles a logic toy, a labyrinth, which first assembling or disassembling requires short consideration. Such design of the chamber enables easy accessing its interior components, such as the weighing pan or chamber base panel, thus ensuring easy cleanness maintenance. The assembled chamber sufficiently protects the weighed object or substance against ambient conditions impact, and in particular against air movement, air drafts that in case of balances with high reading accuracy is indispensable for minimizing weighing errors. Consequently, this feature is ensured by simple structure of the sliding panels. The panels do not comprise any fixing elements, such as hinges, holders, etc. that often are causes for aperture occurrence and inexact contact of the adjacent panels. On the contrary, the preferable threaded connection of the angle bar shaped lock ensures appropriate level of mutual panels contact thus minimizing formation of opening or draftiness. Simple structure of the chamber features minimization of its components. The chamber does not comprise any hinges, swiveling members and similarly troublesome structural components increasing its operation unreliability while disassembling or assembling process, causing purposeless process extension. Additionally, unlike chambers featuring hinges or lifting components, the chamber according to the invention generates low costs related to its manufacturing and assembling. At the same time, the solidity of connections of chamber components is very high, and their operation is precise. The general impression of the chamber on balance operator is advantageous, due to its easy assembling and disassembling process carried out on basis of a single threaded component.

BRIEF DESCRIPTION OF THE DRAWINGS

The present invention is indicated in the accompanying drawings, where.

DETAILED DESCRIPTION OF THE INVENTION

Figure 1:
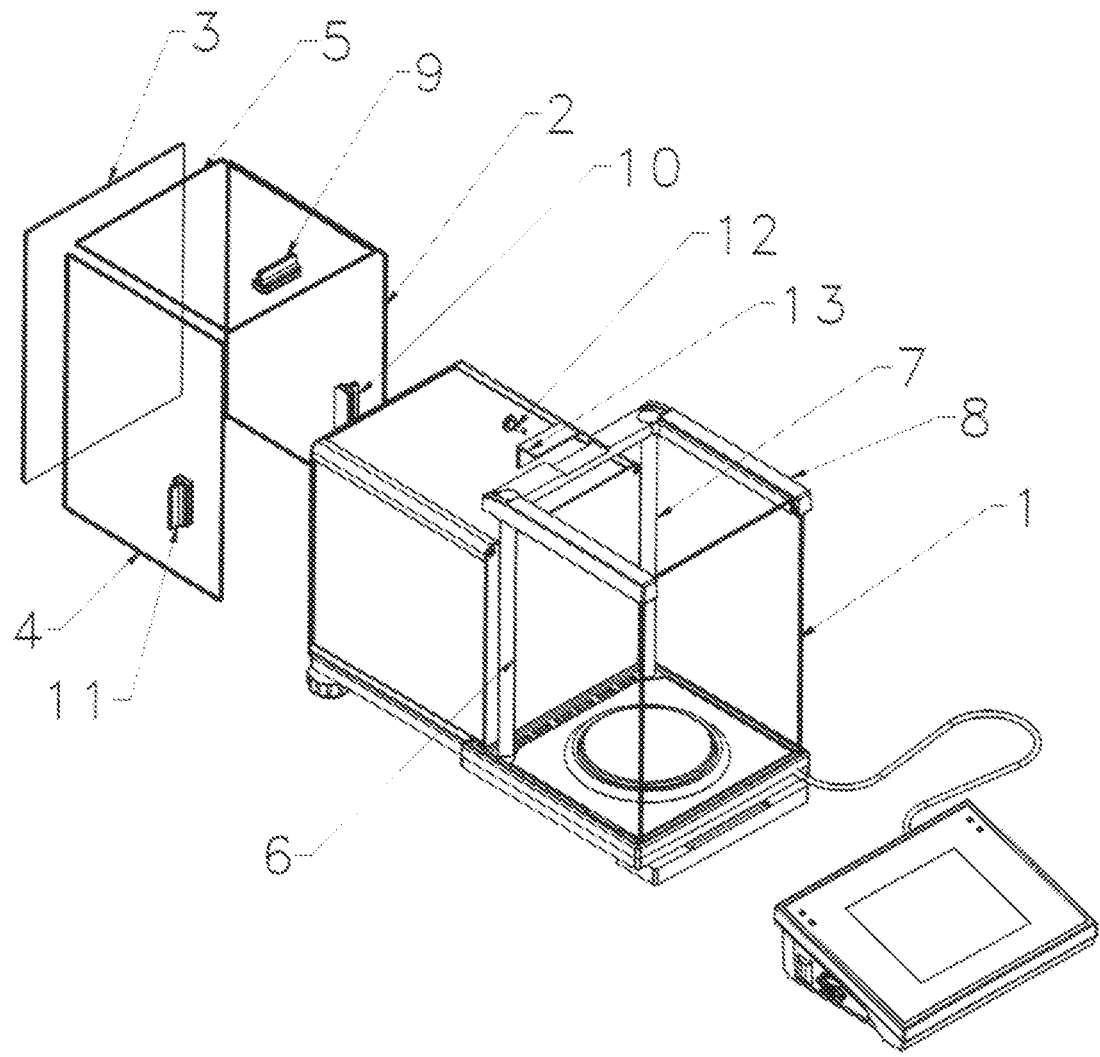
FIG. 1 presents balance in an exploded view, but in a form adopted by the chamber components after assembling, FIG. 2 and FIG. 3 correspondingly presenting cross section through a lock with a screw and a nut.
Figure 2:
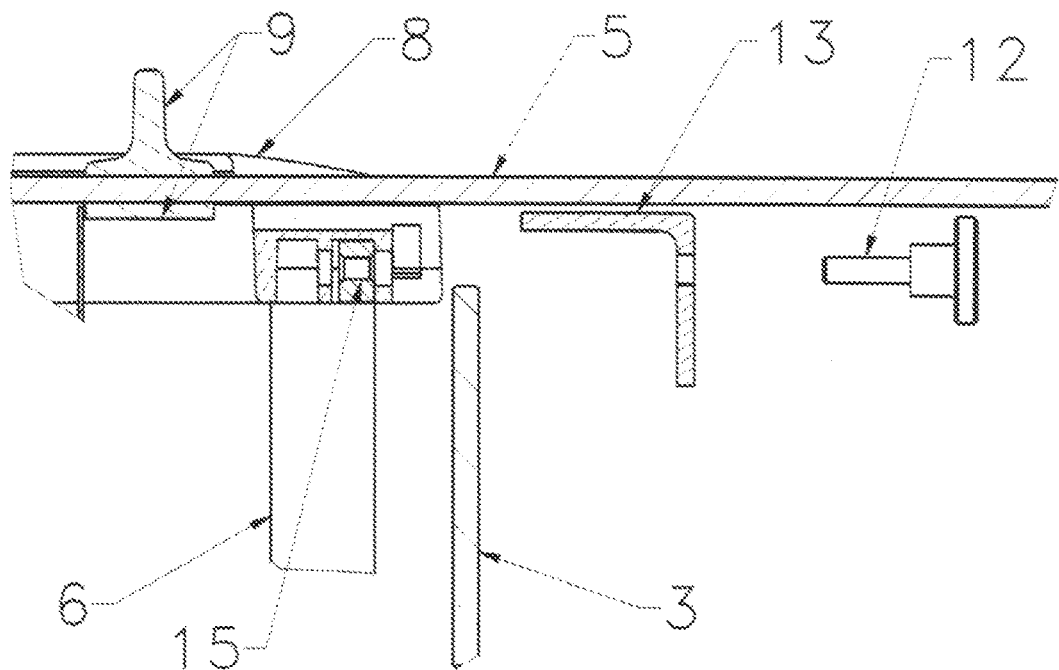
Figure 3:
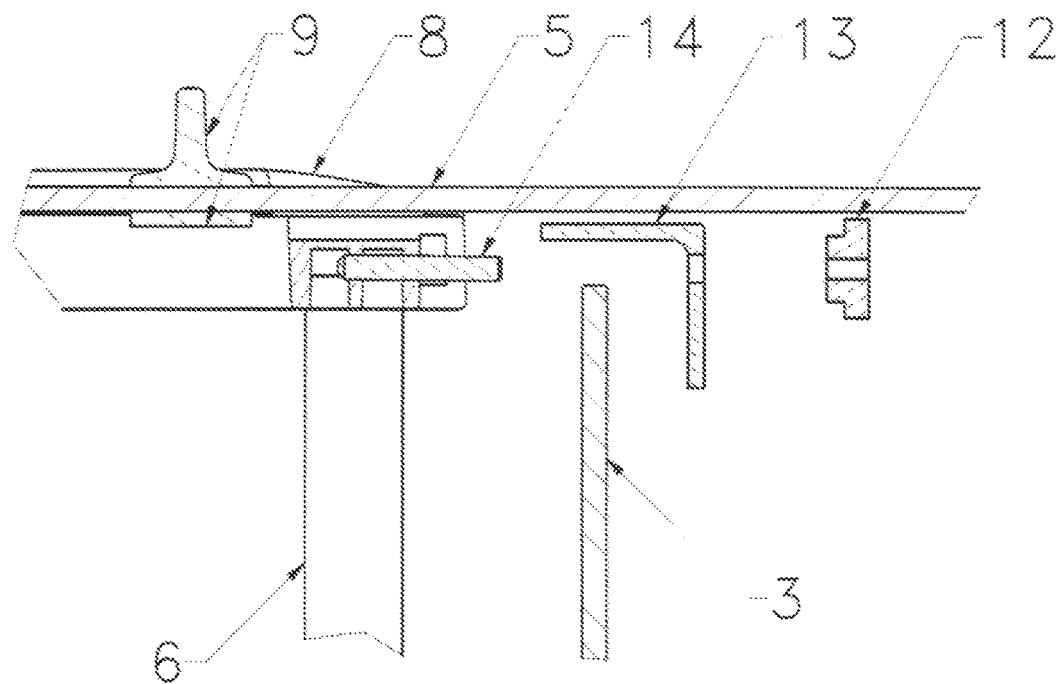
Figure 4:
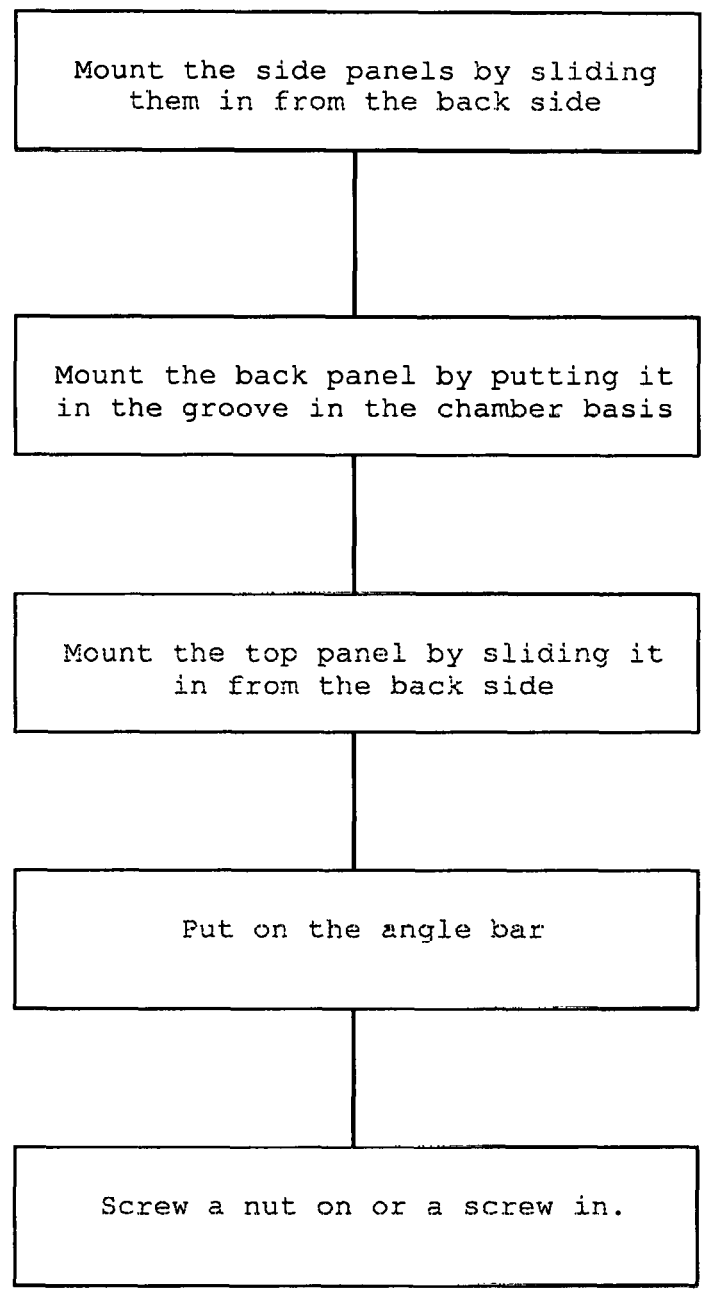
FIG. 4 shows the sequence of steps for assembling.
Figure 5:
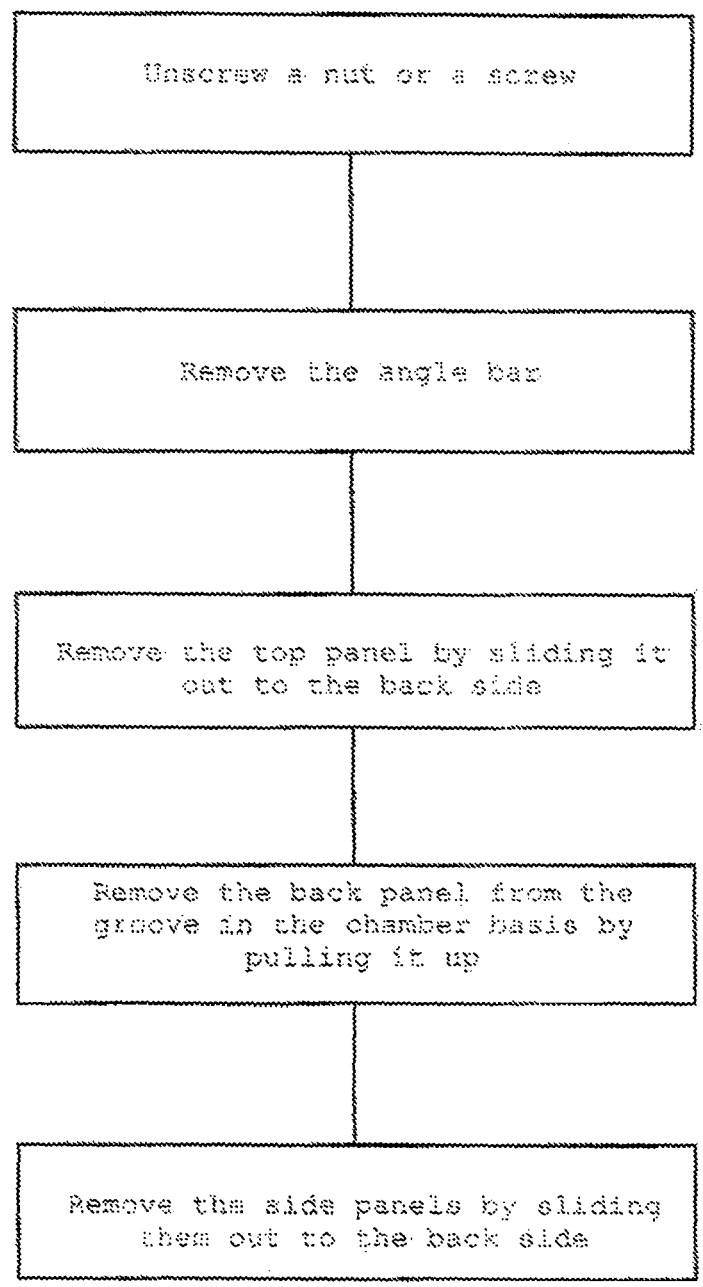
FIG. 5 shows the sequence of steps for disassembling the apparatus

The chamber is cuboid shaped assembly forming a superstructure to a balance and comprises four transparent side panels (1, 2, 3, 4) and a top panel (5). The chamber structure comprising transparent panels is stabilized by two vertical columns (6, 7) assembled at the back corners of the chamber's interior which support the chamber structure (8) comprising a beam for holding and sliding the top and side panels using grips made of plastic (9, 10, 11) fixed on both sides of the panels, which grips, in assembled form, constitute for a limiter against total pulling out of the panel (2, 4, 5), and blocking its sliding put by hooking it against the back panel in case of the side panels (2, 4) and an angle bar (13) in case of the top panel. Clearly, it is possible to assembly another lock, for instance for locking one of the side panels. In this case releasing such lock with appropriate location of the side and back panel provides access to balance pan. Balance design enables disassembling the chamber by carrying out a set of activities in a strictly determined order. First a nut or a screw (12) is unscrewed holding the angle bar (13) protecting the back edge of the top panel (5) against sliding out. In case of using a screw (FIG. 2) a plastic made top structure of crossbars with guides (8) features a metal member with a threaded opening (15). A version (FIG. 3) with a nut in the plastic made top structure (8) features a threaded mandrel (14) for screwing a nut. After removing the angle bar (13), a space is created under which grip's pad (9) can pass while sliding. Sliding out the top panel unlocks the back panel (3) and enables its removing from the groove in the chamber basis without using force. After removing the back panel it is possible to remove the two side panels from the bottom guides, that in chamber's assembled state are locked by grip pads (10, 11) glued on the internal side of the panels and which pads hook against the back panel while pulling out. The front panel (1) is assembled permanently and it supports the structure of the crossbars featuring the top guides (8).

The guides and side panels (2, 4) are designed in a way to maintain maximum air-tightness of the weighing chamber. The bottom and top edges of the side panels (2, 4) are positioned in the guides. The bottom edges of the front (1) and back (3) panel are positioned in grooves. The sliding side panels are slightly longer than the distance between the front and the back panel in order to ensure total covering of the space to access the chamber interior. The size of the front panel (1) ensures that it slightly enters into the grooves of the side guides on the both sides thus complete closure of the chamber requires application of little force, resulting in a characteristic clanking sound of glass.

The invention claimed is:

1. A weighing chamber forming a superstructure of a weighing device, outlining weighing section and protecting the section against air movement and air drafts, in a shape of a transparent cuboid, wherein panels (1, 2, 3, 4, 5) are assembled in guides of a structure (8) using at least a single adjustable lock (13) blocking a top panel in a way that releasing of the top panel enables slide and disassembling of the other panels.

2. The chamber according to claim 1, wherein said fastening lock (13) is a profiled element, an angle bar shaped, assembled in a detachable manner to a horizontal structural beam.

3. The chamber according to claim 2, wherein said fastening lock is assembled in a detachable manner, using a threaded connection (12, 14) and (15).

4. The chamber according to claim 1, wherein the chamber features two vertical columns (6, 7) assembled at back corners of a chamber's interior, wherein the two vertical columns support the chamber structure (8) comprising a horizontal beam for assembling the fastening lock and holding and sliding the top and side panels using grips (9, 10, 11).

5. The chamber according to claim 1, wherein said grips (9, 10, 11) are bilaterally fixed on the panels.

6. A weighing chamber forming a superstructure of a weighing device, outlining weighing section and protecting it against air movement and air drafts, in a shape of a transparent cuboid comprising side panels (1, 2, 3, 4), a top panel (5), and a fastening lock (13) located in a structure (8) comprising guides for the top and side panels, wherein the lock (13) blocks the top panel (5), and the top panel (5) blocks the back panel (3), and the back panel (3) blocks the left and the right panels (2, 4).

7. The chamber according to claim 6, wherein the fastening lock (13) is an angle bar shaped element, assembled in a detachable manner to a horizontal structural beam of the structure (8).

8. The chamber according to claim 7, wherein the fastening lock is assembled in a detachable manner, using a threaded connection (12, 14) or (15).

9. The chamber according to claim 6, wherein the chamber features two vertical columns (6, 7) assembled at back corners of a chamber's interior, wholly included in the interior, that support the chamber structure (8) comprising a horizontal beam for assembling the fastening lock and holding and sliding the top and side panels using grips (9, 10, 11), wherein a mutual stable connection of all elements of the chamber is achieved by at least one blocking member, wherein at least one blocking member is in the form of a lock with a shaped bracket.

10. The chamber according to claim 6, wherein grips (9, 10, 11) are bilaterally fixed on the panels, wherein internal parts of the grips (9, 10, 11) constitute limiters against total pulling out of the slidable panels (2, 4, 5).

11. The chamber according to claim 6, wherein the side panels (2, 4) and the top panel (5) are slidable.

12. The chamber according to claim 6, wherein the structure of the chamber features elements jointed with each other in a sequential manner, wherein a nut or a screw (12) is unscrewed holding an angle bar (13) protecting back edge of the top panel (5) against sliding out, wherein after removing an angle bar (13), a space is created under which a grip's pad (9) can pass while sliding, wherein sliding out the top panel (5) unlocks a back panel (3) and enables its removing from a groove in the chamber basis without using force, wherein after removing the back panel it is possible to remove the two side panels (2, 4) from the bottom guides.

13. The chamber according to claim 6, wherein balance design enables disassembling the chamber by carrying out a set of activities in a strictly determined order, wherein a nut or a screw (12) is unscrewed holding an angle bar (13) protecting back edge of the top panel (5) against sliding out, wherein after removing an angle bar (13), a space is created under which a grip's pad (9) can pass while sliding, wherein sliding out the top panel (5) unlocks a back panel (3) and enables its removing from a groove in the chamber basis without using force, wherein after removing the back panel it is possible to remove the two side panels (2, 4) from the bottom guides.

* * * * *